United States Patent Office 3,050,924
Patented Aug. 28, 1962

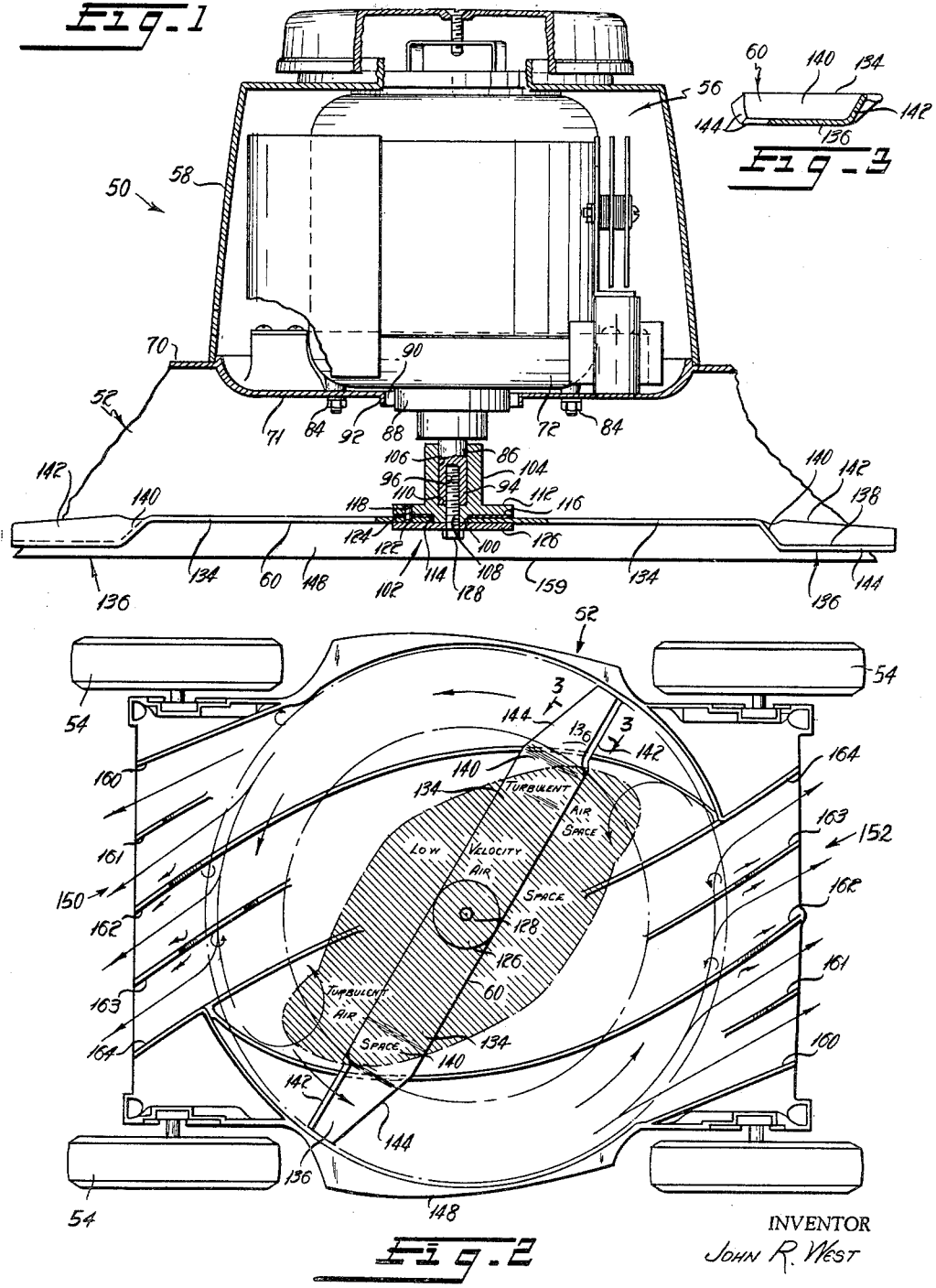

3,050,924
POWER MOWER ROTARY CUTTER DEVICE
John R. West, Marysville, Ohio, assignor to The O. M. Scott & Sons Company, Marysville, Ohio, a corporation of Ohio
Original application July 31, 1957, Ser. No. 675,331, now Patent No. 3,028,717, dated Apr. 10, 1962. Divided and this application July 25, 1961, Ser. No. 126,549
1 Claim. (Cl. 56—295)

This invention relates to a rotary cutter device and more particularly to construction of a cutter device for powered lawn mowers, incorporating features to insure proper handling and cutting techniques conducive to lawn grass growth and plant protection. This application is a division of co-pending application Serial No. 675,331 now Patent No. 3,028,717 filed July 31, 1957 for Power Mower.

The primary purpose of a lawn mower is to cut the grass, and therefore a major factor is to obtain proper shearing of the grass blades at the height best adapted to promulgate healthy continued plant growth and to automatically, evenly distribute the cuttings to prevent spot smothering of the plant life.

There are many inherent factors in previously known power mowers which have resulted in lawn cutting techniques that damage the grass. Unsatisfactory lawn cutting operations include: "scalping," the condition resulting when the blade of the rotary cutter digs into high spots; and "bruising," the repetitive striking of grass blades not properly positioned for clean cutting by high speed cutting blades, incorrect cutting blade shape and the cooperation of blade shape with the housing.

Accordingly, an important object of this invention resides in providing a novel rotary bladed cutter for a lawn mower capable of low speed operation to provide a relatively high tip suction to hold the grass into the cutting path.

Still another object resides in providing for use with a rotary mower, a novel cutter with blade end structure in which the cutting edges of the blades are a minor fraction of the diametral blade dimension and are disposed in a plane below a plane containing the major blade structure.

A still further object resides in the provision of a novel elongate rotary cutter device having a substantially flat major middle portion with diametral arms and coplanar short blade edged ends on the ends of the arms offset below the major middle portion with an abrupt transition bend between each blade edged end and the adjacent arm of the major portion, and a sharply bent trailing edge on each blade end disposed in a direction toward the plane of the major portion, the abrupt transition bend and the sharply bent trailing edge being integrally joined through a transition of compound curvature which provides high strength and dynamic rigidity between the major portion of said cutter device and its blade edged ends to maintain proper blade end position during rotation.

Further novel features and objects of this invention will become apparent from the following detailed description and the appended claim taken in conjunction with the accompanying drawings showing a preferred embodiment thereof, in which:

FIGURE 1 is a partially sectioned side view of a rotary mower with the mower housing broken away to show a mower cutter device constructed in accord with the present invention;

FIGURE 2 is a reduced size bottom view of a rotary mower housing and shows the cutter member in bottom plan view; and FIGURE 3 is an enlarged section detail taken on line 3—3 of FIGURE 2 illustrating the cross section contour of the cutter blade tip.

Briefly, the disclosed exemplary embodiment (FIGURES 1 and 2) of a power mower 50 incorporating the cutter member invention of this application has a body frame casting 52 supported on front and rear sets of wheels 54, one being omitted from FIGURE 2. A low speed electric motor 72 is mounted on top of the frame 52 within a housing with the motor shaft on a vertical axis and projecting below the frame. A specially shaped diametral doubled bladed rotary cutter member 60 is fastened, through a shear pin drive connection, to the motor shaft below the frame and, in operative cooperation with specially devised air flow fins 160—164 on the frame, creates a strong upflow over areas of grass to be cut, creates air swirls, a low velocity swirl around the center and air flow discharge paths from the front and rear of the frame (FIGURE 2). The combination coaction of the cutter member 60 and mower frame 52 is completely disclosed and claimed in the aforenoted parent application and will not be described in detail herein.

Mower 50 includes a housing frame 52 with four wheels 54, an electric motor power assembly 56 enclosed by the motor housing 58 and a handle assembly (not shown herein) which carries mower control components. Power for motor assembly 56 is supplied through the electric components and circuitry in the handle assembly and in the motor housing 58. These components are not part of the present invention.

Mower housing 52 is preferably made of cast metal, i.e. steel, aluminum, an alloy or the like and its upper wall 70 provides a rigid horizontal platform with a depressed area 71 to carry the motor assembly 56 which in turn carries the rotary cutter 60. Motor 72 is centrally located and secured as by studs and nuts 84 in the depression 71 on the top of the mower housing horizontal wall 70 with the axis of motor shaft 86 vertically disposed. A bearing boss 88 on the lower end bell of motor 72 projects into an opening 90 through the mower housing wall 70 which includes a narrow depending annular flange 92. There is but a slight clearance between boss 88 and the flange 92. The opening flange 92 serves as a barrier against debris passing from below the mower housing to the interior of the motor housing. The depressed sink 71 funnels any moisture, which may advertently enter the motor housing 58, to opening 90 thence to ground and also aids in heat dissipation from the motor housing 58 by providing an increased area over which air flow above the cutter 60 can pass. The lower end 94 of motor shaft 86 has a threaded blind bore 96 and projects from the motor through the mower housing opening 90 to a position below the mower housing horizontal wall 70.

Rotary cutter 60 is an elongate member, made of flat steel material, with a central aperture 100. The cutter hub assembly 102 through the means of the aperture 100 secures the cutter 60 to a motor shaft end 94 and includes a safety shear pin arrangement. Hub assembly 102 includes a collet 104 with a bore 106 and counterbore 108 which provides a shoulder 110 at the base of bore 106. The lower end of collet 104 has an integral radially disposed annular flange 112 and a coaxial depending piloting flange 114 around the counterbore 108. A fibre washer 116 is disposed over the piloting flange 114 against the radial flange 112 and the cutter 60 is disposed, with its aperture 100 around the piloting flange 114, against the fibre washer 116. A small hole 118 in the collet radial flange 112, a similar hole in the fibre washer 116 and another countersunk hole 122 in cutter 60 are aligned in assembly and a bevel headed shear pin 124 inserted through cutter 60, fibre washer 116 and collet flange 112 with the beveled head disposed in the countersunk portion of the hole 122 in the cutter bar. The depth of piloting flange 114 is very slightly less than the combined thicknesses of the fibre washer 116 and cutter 60, and the shear pin 124, cutter 60, fibre washer 116 and collet 104 are clamped together and secured, with collet bore 106 and inner shoulder 110 over the motor shaft end 94, by a steel washer 126 and screw 128 which is threaded into shaft end bore 96. Washer 126 is clamped against the end of piloting flange 114 and presses the cutter 60 and fibre washer 116 together to provide a snug fit with a slight friction which with shear pin 124 transmits sufficient torque to ensure a drive connection between the collet 104 and the cutter 60 for normal cutting operations. However, if the cutter 60 hits an iron stake, a rock or some other similar object, the drive torque between the collet 104 and cutter 60 is transmitted through the shear pin 124 which will fail and is intended to decrease detrimental effects on the motor such as bending of the shaft 86.

The elongate cutter 60 has a planar flat midportion which includes two horizontally extended long arms 134 each of which arms terminates in a short bladed end 136 tapered as seen in plan (FIGURE 2) to a reduced tip width. Each bladed end 136 includes a horizontal leading portion 138 offset approximately ½ inch below the plane of the major portion of arms 134 by an abrupt transition portion 140 bent approximately forty degrees (40°) from the planes of the arms and the blade end. The trailing portion 142 of each bladed end 136 is curved upwardly and has a slight taper to a narrower upsweep at the tip. The leading edge 144 of horizontal portion 138 and bend 140 is heat treated and beveled to form a swept back knife edge. This sweepback of knife edge 144 enables a shearing cut on grasses as the cutter 60 is rotated. By abruptly bending the bladed ends 136 to an offset position and also bending their trailing portion into an upswept trailing edge an extremely strong compound transition is formed between the major portion of arms 134 and the bladed ends 136 to provide rigidly disposed bladed ends despite the abrupt bend 140.

The trailing edge portions 142 are upswept approximately 60 degrees to form the end portions 136 of cutter 60 as highly effective compound axial and centrifugal flow fan blades, which upon rotation of cutter 60 provide a strong axial flow suction above the grass under the mower housing 52. The relatively high angle of the upswept trailing edge is required to obtain the proper suction under low (1750 r.p.m.) speed rotation to lift the grass upright and enable a clean, even cut, and to also vacuum the lawn, pulling dead debris into the blade ends 136 for subsequent removal.

Inasmuch as the major portions of arms 134 are disposed in a horizontal plane above the abrupt dependent offset of the bladed ends 136, the only portions of the cutter 60 that contact the growing grass are the short bladed portions 136. This important construction eliminates to a large extent the repeated beating and bruising of the tips of growing grass by major portions of the cutter 60 subsequent to actual cutting of the grass.

As clearly illustrated in FIGURE 2, the underside of mower housing 52 has depending side skirts 148 and intermediate fins forming internal air flow paths with similar front and rear discharges 150 and 152. The underside is essentially symmetrical fore and aft of the cutter axis, the only non-symmetrical aspects deriving from casting depressions due to selected exterior design configuration, and from the depressed motor support sink 71.

As has been described, the major portions of the cutter arms 134 are disposed above the level of the blade ends 136. When an object is picked up during forward mower travel it is generally ricocheted between the forward fins and will have a tendency to fall down under the center of the mower. As this position is under the raised portions of cutter arms 134, the object is no longer hit by the cutter. Also the center portions of cutter 60 are traveling at much less speed than the blade ends 136 and cannot exert a large force on an object.

Most motors, both gasoline and electric but particularly electric, do not have sufficient power to effectively cut the grass and properly discharge it from the mower. For this reason, the mower power plants are subject to continual stalling and at times, in the case of an electric motor, overheating. To overcome this difficulty most mower manufacturers have increased the revolutions per minute to between 3000 and 6000. The momentum of the blade at such high speeds normally will carry it through heavier work loads when one hits a heavier patch of grass and in such manner reduces the amount of stalling. However, a blade traveling at this high speed, hits the grass many more times than does a blade at the preferred 1725 r.p.m.'s used in the electric mower embodiment of the invention described in the aforenoted application. At higher speeds of blade rotation the grass is actually beat until the sap in the grass forms a gooey mass and causes the clippings to bunch and cling to the inside surfaces of the mower, building up static deposits until the weight of the clippings becomes so heavy that gravity pulls them from the mower and they drop in clumps or are thrown out of the mower onto the grass. Such clumps of clippings are normally referred to as "balled clumps," which are not picked up by sweepers and are difficult to rake up. The "balled clumps" mat to the soil and grass, smothering the covered grass and eventually result in large bare spots in the lawn unless the clumps are gathered by hand.

The preferred revolutions per minute of a nineteen inch cutter is 1725 which provides an approximate 92 m.p.h. tip speed. The major inner portions of the blade arms 134 have been raised so they will not hit the grass. At the relatively low speed at which the blade will be traveling, only approximately the first 1″ of the blade is actually doing any cutting and except when the mower is tilted at an angle, to do a double mowing job, the grass is being cut only on the forward half of the rotation of the blade. To eliminate beating of the tips of the grass, after it has once been cut, the extent of the actual cutting edge of the cutter blade ends at the level of the mown grass has been reduced to a minimum, as has been described.

The combined low speed, the short cutting edges of the cutter and the air flow created by the blade ends within the housing of this mower are a result of a definite effort in studying the air movement within an enclosure, such as used above the cutter of a rotary mower, to develop a principle whereby the grass will be cut much the same as it is with a reel mower. The ideal cutter tip speed must be sufficient to obtain a scythe cutting action by the blades, yet it must be kept low. However, if the speed is too low the fan efficiency will suffer. Thus, experiments have shown that an r.p.m. of approximately 1700 on a 19 inch blade will provide sufficient suction to raise the grass and also result in proper cutting action at the cutter blade tips without detrimentally beating the grass blades. Using a longer blade, e.g., a twenty-one inch blade, an r.p.m. of approximately 1400 will give a desired proper cutting and suction action at the blade tips. Of course the cutting edges must always be sharp or the grass will be torn, not cut. Most of the grass clippings will be as long as the difference between the height of the grass and the height of the cut. The raised trailing edge 142 of the blade 136 which causes the suction and pulls the grass up to be cut off, also causes a combination axial and centrifugal puff of air as it passes each fin, and this in turn creates a discharge flow and sufficient turbulence where the blade passes the fins to prevent static accumulations of cuttings.

Considering all of the foregoing factors including the detailed description of the illustrated embodiment, there has been disclosed a rotary cutter device for a power mower. The specially designed cutter lets only the end cutting blade edges touch the grass and eliminates beating and browning of the turf by the higher unsharpened portions. A strong blade suction lifts grass upright to give clean, even cut and reduces matting because it vacuums the lawn as it mows, pulling dead debris to surface so it can be removed.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

An elongate rotary cutter unit for use in combination with a rotary type lawn mower having a vertical drive shaft, said cutter unit comprising: a planar flat mid portion constituting the major extent of the elongate dimension of said unit and including two diametrically arranged long arms, a short flat end portion on the opposite ends of said arms offset from and parallel with said arms, each of said short end portions being made structurally integral with its associated arm through an abrupt transition portion having bends of approximately forty degrees from parallel planes through said arms and said end portions, and means at the middle of said flat mid portion rigid with both said arms enabling the securing of the cutter unit to the mower drive shaft so the cutter unit will rotate with said end portions in a common planar circular path; the forward edge of said end portions being knife edged and swept back; a trailing edge portion on each end portion having a sharply upswept flange of approximately sixty degrees from a plane parallel to said arms and said end portions; and said abrupt transition portion and said upswept trailing edge portion being integrally joined by a bend portion of compound curvature providing high strength and dynamic rigidity between said cutter unit arms and associated said end portions.

References Cited in the file of this patent

UNITED STATES PATENTS

| | | |
|---|---|---|
| 2,682,142 | Clark | June 29, 1954 |
| 2,869,304 | Colburn | Jan. 20, 1959 |